(12) United States Patent
Smith

(10) Patent No.: US 7,192,054 B2  
(45) Date of Patent: Mar. 20, 2007

(54) LOCKING INITIATOR ASSEMBLY FOR AN AIRBAG INFLATOR DEVICE

(75) Inventor: Bradley W. Smith, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 398 days.

(21) Appl. No.: 10/732,996

(22) Filed: Dec. 11, 2003

(65) Prior Publication Data

US 2005/0127649 A1   Jun. 16, 2005

(51) Int. Cl.
 *B60R 21/26* (2006.01)
(52) U.S. Cl. ........................ 280/741; 102/530
(58) Field of Classification Search ........... 280/736, 280/737, 741; 102/530, 531, 202.5, 202.12
See application file for complete search history.

(56) References Cited

U.S. PATENT DOCUMENTS

| | | | |
|---|---|---|---|
| 5,454,320 A | 10/1995 | Hilden et al. | |
| 5,487,559 A * | 1/1996 | Headley | 280/735 |
| 5,496,065 A * | 3/1996 | Osborne et al. | 280/740 |
| 5,558,366 A | 9/1996 | Fogle, Jr. et al. | |
| 6,056,314 A | 5/2000 | Shirk et al. | |
| 6,146,598 A | 11/2000 | Duvacquier et al. | |
| 2002/0162476 A1* | 11/2002 | Parker et al. | 102/530 |

FOREIGN PATENT DOCUMENTS

GB    2 298 475 A    9/1996

* cited by examiner

*Primary Examiner*—Paul N. Dickson  
*Assistant Examiner*—Tiffany L. Webb  
(74) *Attorney, Agent, or Firm*—Sally J Brown; Pauley Petersen & Erickson

(57) ABSTRACT

An initiator assembly for an inflator device having at least one inflator device mating lug. The initiator assembly includes an initiator having an initiator cup at least in part defining a storage chamber containing a reactive charge. The initiator also includes at least one electrical connector in reaction initiating communication with the reactive charge. The initiator assembly has a molded body fitting over at least a portion of the initiator. The molded body includes at least one locking flange that is adapted to lockingly engage the at least one inflator device mating lug.

28 Claims, 7 Drawing Sheets

LOCKING INITIATOR ASSEMBLY FOR AN AIRBAG INFLATOR DEVICE

BACKGROUND OF THE INVENTION

This invention relates generally to inflator devices such as for use in inflatable safety restraint installations and, more particularly, to an initiator assembly for joining an initiator to an inflator device.

Inflatable safety restraint installations typically use an inflator device to produce inflation gas for inflating the airbag in the event of a collision. The inflator device often includes a gas generant material stored within an inflator device housing and an initiator in combination with the housing that actuates the gas generant material. The initiator typically includes a reactive charge in combination with electrical connectors. A signal sent through the electrical connector actuates the reactive charge, which produces reaction products that actuate the gas generant material.

Initiators are often joined to a base of an inflator device. Initiators can also be joined to an adapter plate, and the adapter plate is joined, such as, for example, by welding and/or crimping, to the inflator device. Currently, initiators are generally joined to inflator devices or adapter plates in one of two techniques. A first technique to join an initiator to an inflator device is by inserting the initiator into an appropriate machined interface and crimping the interface to secure the initiator. Such crimping requires that a precise interface be machined into the inflator device or adapter plate. Crimping is thus relatively expensive and some crimping processes are known to have quality control problems due to burrs, e.g., metal slivers, occasionally left by the machining and/or crimping processes. The burrs can cause short circuits, for example, between the electrical connectors or one of the electrical connectors and a metal housing, or other installation problems. A second way to join an initiator to an inflator device is by integrally molding an initiator directly to an inflator device using a moldable material, such as a thermoplastic. Such integral molding is typically less expensive than the crimping method mentioned above. However, a hermetic seal between the initiator and the inflator device can be difficult to maintain as the thermoplastic expands and contracts during temperature cycles common during installation procedures. Therefore, such integral molding techniques often require carefully designed joint geometries that may not be possible in some types of inflator devices.

Thus, there remains a need for an initiator assembly that minimizes or eliminates the need for expensive and complicated machining. Further, there remains a need for an initiator assembly that provides a desirable seal with the inflator device and for an initiator assembly that is relatively inexpensive to produce and easy to join to an inflator device.

SUMMARY OF THE INVENTION

A general object of the invention is to provide an improved initiator assembly.

A more specific objective of the invention is to overcome one or more of the problems described above.

The general object of the invention can be attained, at least in part, through an initiator assembly for an inflator device having at least one inflator device mating lug. The initiator assembly includes an initiator having an initiator cup at least in part defining a storage chamber containing a reactive charge. The initiator also includes at least one electrical connector in reaction initiating communication with the reactive charge. The initiator assembly has a molded body fitting over at least a portion of the initiator. The molded body includes at least one locking flange that is adapted to lockingly engage the at least one inflator device mating lug.

The prior art generally fails to disclose an initiator assembly that minimizes or eliminates the need for expensive and complicated machining. The prior art also generally fails to disclose an initiator assembly that provides a desirable seal with the inflator device and an initiator assembly that is relatively inexpensive to produce and easy to join to an inflator device.

The invention further comprehends an initiator assembly for an inflator device including a base having a centrally disposed opening. The initiator assembly includes an initiator having an initiator cup at least in part defining a storage chamber containing a reactive charge. The initiator also includes at least one electrical connector in reaction initiating communication with the reactive charge. A molded body including at least one groove in an outer surface fits over at least a portion of the initiator. A connector socket, including at least one socket arm having a latch, is adapted to connect to the molded body through the opening of the inflator device base. The socket arm latch tab(s) is(are) adapted to engage the groove(s) of the molded body.

The invention still further comprehends an initiator assembly including an initiator having an initiator cup at least in part defining a storage chamber containing a reactive charge. The initiator also includes at least one electrical connector in reaction initiating communication with the reactive charge. A molded body, having an extension portion including a locking flange, fits over at least a portion of the initiator. A plate includes a plate opening and a mating lug adjacent the plate opening. At least a portion of the molded body extension portion extends into the plate opening and the locking flange lockingly engages the mating lug.

The invention still further comprehends an initiator assembly including an initiator having an initiator cup at least in part defining a storage chamber containing a reactive charge. The initiator also includes at least one electrical connector in reaction initiating communication with the reactive charge. A molded body fits over at least a portion of the initiator. The molded body includes an extension portion over at least a portion of the at least one electrical connector. The molded body extension portion includes a first locking flange on a first extension portion side and a second locking flange on a second extension portion side opposite the first extension portion side. The molded body extension portion additionally includes a first groove disposed in an outer surface and between the first and second locking elements and a second groove disposed in an outer surface and between the first and second locking flange on a side of the molded body extension portion opposite the first groove. The initiator assembly also includes a connector socket including a first socket arm having a first latch tab and a second socket arm having a second latch tab, and a plate including a plate opening. A first mating lug is adjacent the plate opening and a second mating lug is adjacent the plate opening on an opposite side from the first mating lug. At least a portion of the molded body is disposed on a first side of the plate and at least a portion of the connector socket is disposed on a second side of the plate opposite the plate first side. At least a portion of the molded body extension portion extends through the plate opening and the first locking flange is lockingly engaged with the first mating lug and the second locking flange is lockingly engaged with the second mating lug. The first latch tab of the connector socket first arm is engaged with the first groove and the second latch tab of the connector socket second arm is engaged with the second groove.

As used herein, references to "reaction initiating communication" are to be understood to refer to a relationship between an initiating component, such as an electrical connector, and a reactable material, such as a reactive charge, wherein the initiating component is able to actuate reaction of the reactable material.

Other objects and advantages will be apparent to those skilled in the art from the following detailed description taken in conjunction with the appended claims and drawings.

DETAILED DESCRIPTION OF THE INVENTION

The present invention provides an initiator assembly that has at least one locking element that lockingly engages a corresponding mating element on an inflator device or an adapter plate for an inflator device. Particular embodiments of the invention will be described below with reference to a base of an inflator device. As will be appreciated by one skilled in the art following the teachings herein provided, the broader practice of the invention is not limited to an initiator assembly being joined to an inflator device base, as the initiator assembly can be joined to any portion, such as any wall, of an inflator device or an adapter plate for an inflator device. Other particular embodiments of the invention will be described below with reference to a plate. The plate can include the mating elements described above, and the plate can, for example, be, or form at least part of, a base, or other wall, of an inflator device. The plate can also be an adapter plate for joining the initiator assembly to an inflator device.

In one embodiment of the invention, a portion of the initiator assembly is inserted into an opening in an inflator device or adapter plate, and rotated to lockingly engage a locking flange with a corresponding mating lug. Such a rotating locking mechanism is generally referred to as a "breech-lock." The breech-locking initiator assembly of the invention is relatively inexpensive and easy to produce and assemble to an inflator device, and can provide a desirable hermetic seal between the initiator assembly and the inflator device.

Figure 1:
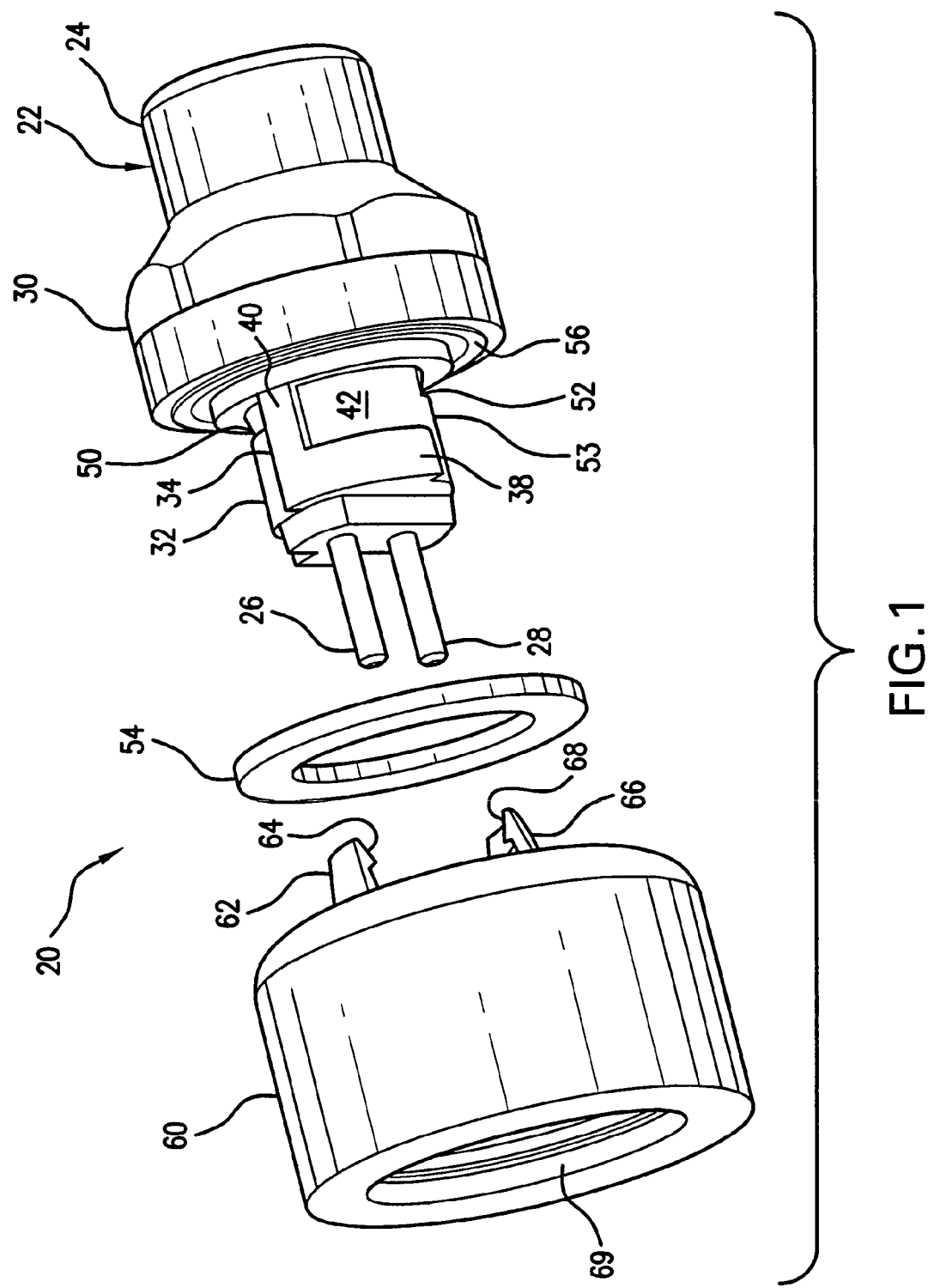
FIG. 1 shows an exploded view of an initiator assembly according to one embodiment of the invention.
Figure 2:
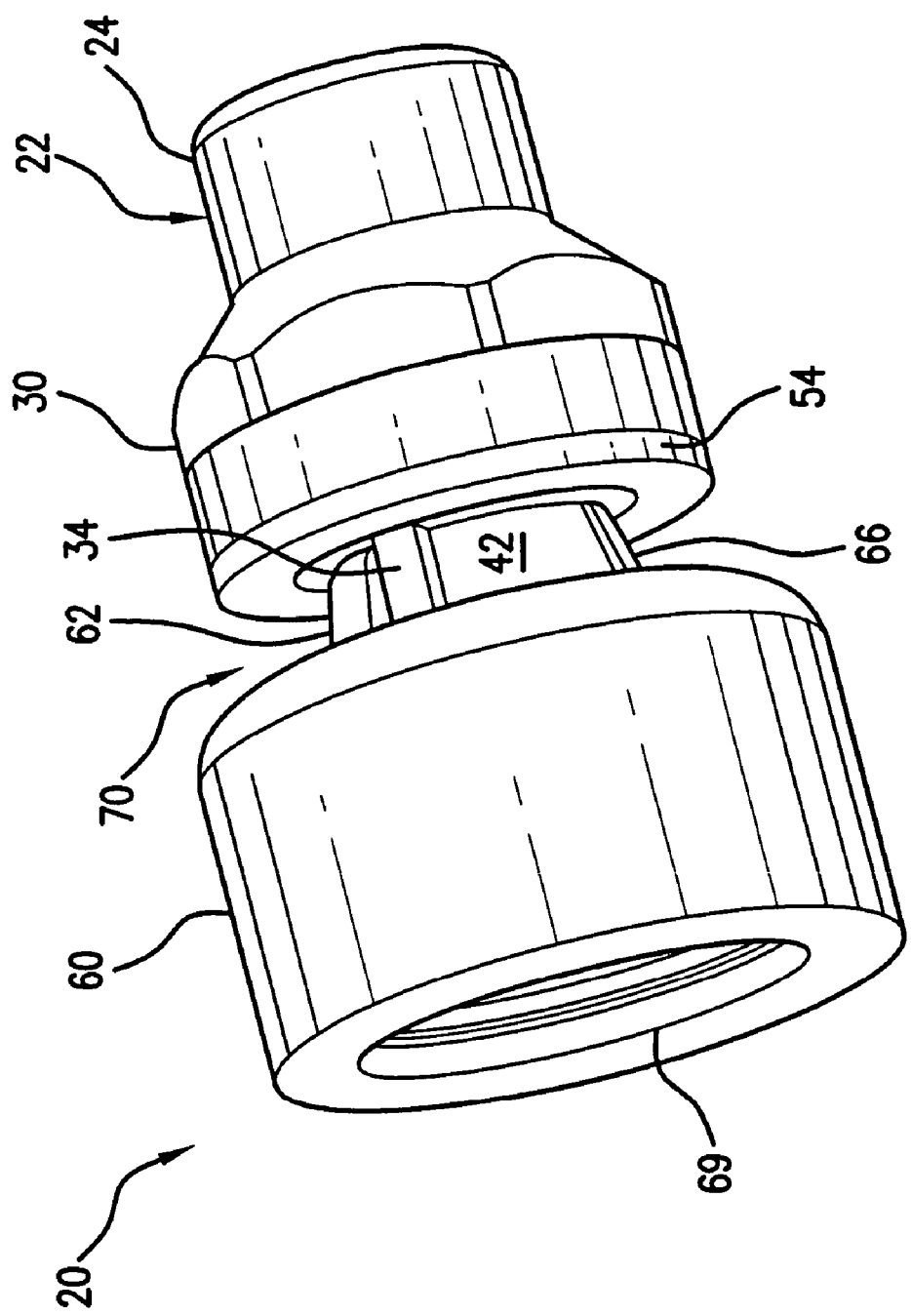
FIG. 2 shows an isometric view of the initiator assembly shown in FIG. 1.

FIG. 1 shows an exploded view of an initiator assembly 20 according to one embodiment of the invention. FIG. 2 shows the initiator assembly 20 in assembled form. The initiator assembly 20 includes an initiator 22. The initiator 22 includes an initiator cup 24 at least in part defining a storage chamber within the initiator cup 24. The storage chamber contains a reactive charge (not shown), which is reactable upon receiving an electric signal. The initiator of this invention also includes two electrical connectors, shown as electrical connector pins 26 and 28, that are in reaction initiating communication with the reactive charge. The electrical connector pins 26 and 28 are capable of transmitting an electric signal to the reactive charge.

A molded body 30 fits over a portion the initiator 22. The molded body 30 includes an extension portion 32 over a portion of the electrical connector pins 26 and 28. The extension portion 32 has a first locking flange 34 and a second locking flange (not shown) on an opposite side of the extension portion 32 from the first locking flange 34. The first locking flange 34 and the second locking flange are each adapted to lockingly engage a corresponding mating lug of an inflator device. The first flange 34 is "L"-shaped, having a first flange portion 38 disposed perpendicular to a second flange portion 40. The first flange portion 38 and the second flange portion 40 form a locking recess 42 into which a corresponding mating lug of an inflator device fits to lockingly join the initiator assembly 20 to the inflator device. The second locking flange has a similar configuration, only on the opposite side of the initiator assembly extension portion 32 from the first locking flange 34. In one embodiment of the invention, the first locking flange 34 and the second locking flange desirably have identical configurations and are located on opposite sides of the extension portion 32.

The molded body extension portion 32 additionally includes two grooves 50 and 52. The grooves 50 and 52 are used to join or connect a connector socket 60 to the molded body, such as is described below for one embodiment of the invention. In the molded body 30, a first groove 50 is disposed in an outer surface 53 of the extension portion 32 and between the first locking flange 34 and the second locking flange. A second groove 52 is disposed in the outer surface 53, and between the first locking flange 34 and the second locking flange, on a side of the molded body extension portion 32 opposite the first groove 50.

The initiator assembly 20 includes a sealing gasket 54. The sealing gasket 54 is adapted to fit about the molded body extension portion 32. The sealing gasket 54 is desirably made of a deformable material, such as nitrile rubber or ethylene propylene rubber, such that when the molded body 30 is joined to, for example, an inflator device, the sealing gasket 54 is compressed. The compressed sealing gasket 54 desirably provides a hermetic seal between the molded body 30 and an associated inflator device (not shown). The sealing gasket 54 includes a groove (not shown in FIG. 1) disposed in a side of the sealing gasket 54 in contact with the molded body 30. The groove is adapted to receive a rim 56 on the molded body 30. As will be appreciated by one skilled in the art following the teachings herein provided, sealing gaskets constructed of various materials and having various configurations can desirably be employed in specific embodiments of the invention.

The initiator assembly 20 includes a connector socket 60. The connector socket 60 includes a first socket arm 62 having a first latch tab 64 and a second socket arm 66 having a second latch tab 68. The connector socket 60 is joined or connected to the molded body extension portion 32 by the first and second socket arms 62 and 64. The first latch tab 64 of the first socket arm 62 is adapted to engage the first groove 50 of the molded body extension portion 32 and the second latch tab 68 of the connector socket second arm 66 is adapted to engage the second groove 52 of the molded body extension portion 32. The connector socket 60 includes an opening (not shown), through which the electrical connector pins 26 and 28 extend. The connector socket 60 includes a mating interface 69 for containing at least a portion of the electrical connector pins 26 and 28. The mating interface 69 is desirably configured to receive an electrical receptacle to connect to the electrical connector pins 26 and 28.

FIG. 2 shows the connector socket 60 and the sealing gasket 54 connected to the molded body extension portion 32. In one embodiment of the invention, the initiator assembly 20 is joined to an inflator device having mating lugs. Each of the first locking flange 34 and the second locking flange are adapted to lockingly engage a corresponding mating lug of an inflator device. As the individual components of the initiator assembly can be separately manufactured and easily locked, or otherwise snap-fitted, together during assembly of an inflator device, the initiator assembly of the invention is relatively inexpensive and easy to produce and assemble into an inflator device.

In one embodiment of the invention, the initiator assembly 20 can be joined to a base of the inflator device having an opening and two mating lugs protruding into the opening. To join the molded body 30 to the inflator device, the molded body extension portion 32 is first inserted, at least partially, through the inflator device base opening such that a first mating lug is aligned with the locking recess 42 formed by the first locking flange 34 and a second mating lug is aligned with a second locking recess formed by the second locking flange. The molded body 30 shown in FIG. 1 is adapted to rotate about an axis perpendicular to a surface of the base of the inflator device with an angle of rotation of about 90 degrees or less to effect the locking engagement of the first locking flange 34 and the second locking flange with the first and second inflator device mating lugs, respectively. Upon turning the molded body 30, the first mating lug slides into the locking recess 42 until the mating lug contacts the second locking flange portion 40. Similarly, the second mating lug slides into the second locking recess. In one embodiment of the invention, the sealing gasket 54 is disposed between at least a portion of the molded body and the inflator device base.

As will be appreciated by one skilled in the art following the teachings herein provided, the broader practice of the invention is not limited to embodiments having two locking flanges. The initiator assembly molded body of the invention includes at least one locking flange, and can include more than two locking flanges. In one embodiment of the invention, the initiator assembly includes only one locking flange which desirably extends about halfway around the outer circumference of a cylindrical molded body extension portion. The locking flange is adapted to lockingly engage to an inflator device base having one mating lug that is appropriately sized to fit into the locking recess of the locking flange. In such an embodiment, the molded body is adapted to rotate about an axis perpendicular to a surface of the inflator device base with an angle of rotation of about 180 degrees or less to effect the locking engagement of the locking flange with an inflator device mating lug. As will be appreciated by one skilled in the art following the teachings herein provided, the angle of rotation needed to join the molded body to the inflator device or an adaptor plate will generally depend on the number, size, and configuration of the locking flanges and mating lugs.

As will be appreciated by one skilled in the art following the teachings herein provided, the initiator assembly can include an initiator and a molded body and be joined to an inflator device without a connector socket. In another embodiment of the invention, such as shown in FIG. 2, the connector socket 60 attaches to the molded body 30. To join the initiator assembly 20 to an inflator device base (not shown), at least a portion of the molded body 30 is disposed on a first side of the inflator device base and at least a portion of the connector socket 60 is disposed on a second side of the inflator device base opposite the inflator device base first side. The molded body 30 is joined to the inflator device base via the locking flanges as described above. The connector socket 60 connects to the molded body 30 by the first and second socket arms 62 and 66 extending through the opening of the inflator device base. Each of the socket arm latch tabs 64 and 68 is adapted to engage the first and second molded body groove 50 and 52, respectively, thereby connecting the connector socket 60 to the molded body extension portion 32. The initiator assembly 20 shown in FIG. 2 has a space 70 between a portion of the molded body 30 and a portion of the connector socket 60 and extending around the molded body extension portion 32. When the initiator assembly 20 is joined to an inflator device base (not shown), the base is partially disposed within the space 70, around the molded body extension portion 32 and between the connector socket 60 and a portion of the molded body 30.

The initiator assembly of the invention has been described above with reference to particular embodiments including a locking flange that lockingly engages a corresponding inflator device mating lug. As will be appreciated by one skilled in the art following the teachings herein provided, in the broader practice of the invention, the initiator assembly does not require such a locking flange. In one embodiment of the invention, an initiator assembly is joined to an inflator device by at least one socket arm of a connector socket and at least one corresponding groove in a molded body. The connector socket connects to a molded body through an opening in an inflator device. The molded body is disposed on one side of an inflator device wall or base, and the connector socket is disposed on another side of the inflator device wall or base. The socket arm(s) of the connector socket snap(s) to the molded body groove through the opening in the inflator device wall or base, thereby joining the initiator assembly to the inflator device.

In another embodiment of the invention, the connector socket additionally includes a protrusion, such as described below, that correspondingly fits or snap-locks into a slit of the inflator device to directly join or connect the connector socket to the inflator device. The protrusion/slit combination can be used to supplement the socket arm connection with the molded body groove, thereby increasing the overall strength of the initiator assembly.

In one embodiment of the invention, the molded body 30 and the connector socket 60 are formed of plastic. After being joined together and to an inflator device, the plastic molded body 30 and plastic connector socket 60 can be welded together and/or to the inflator device, such as by ultrasonic welding.

Figure 3:
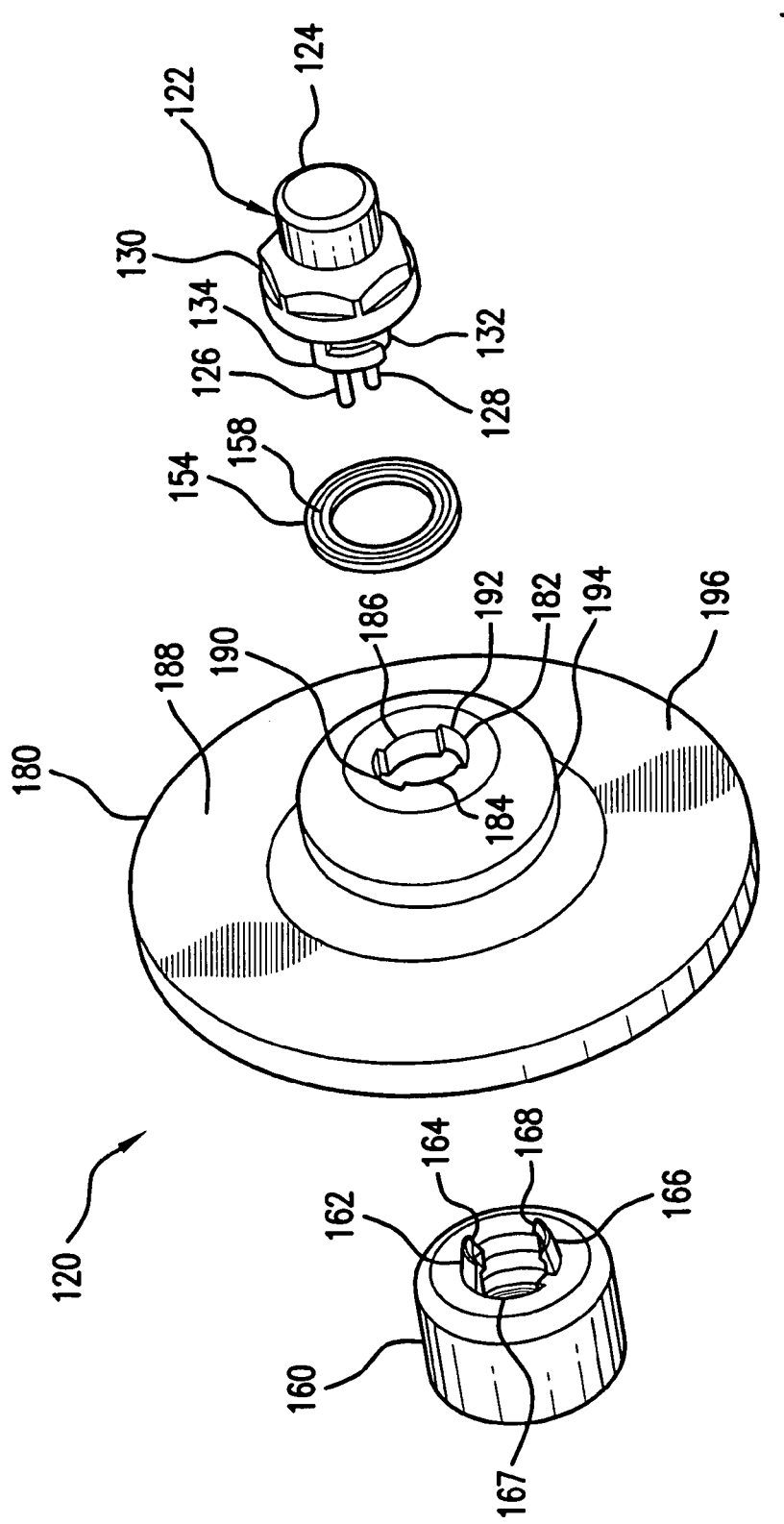
FIG. 3 shows an exploded view of an initiator assembly according to another embodiment of the invention.
Figure 4:
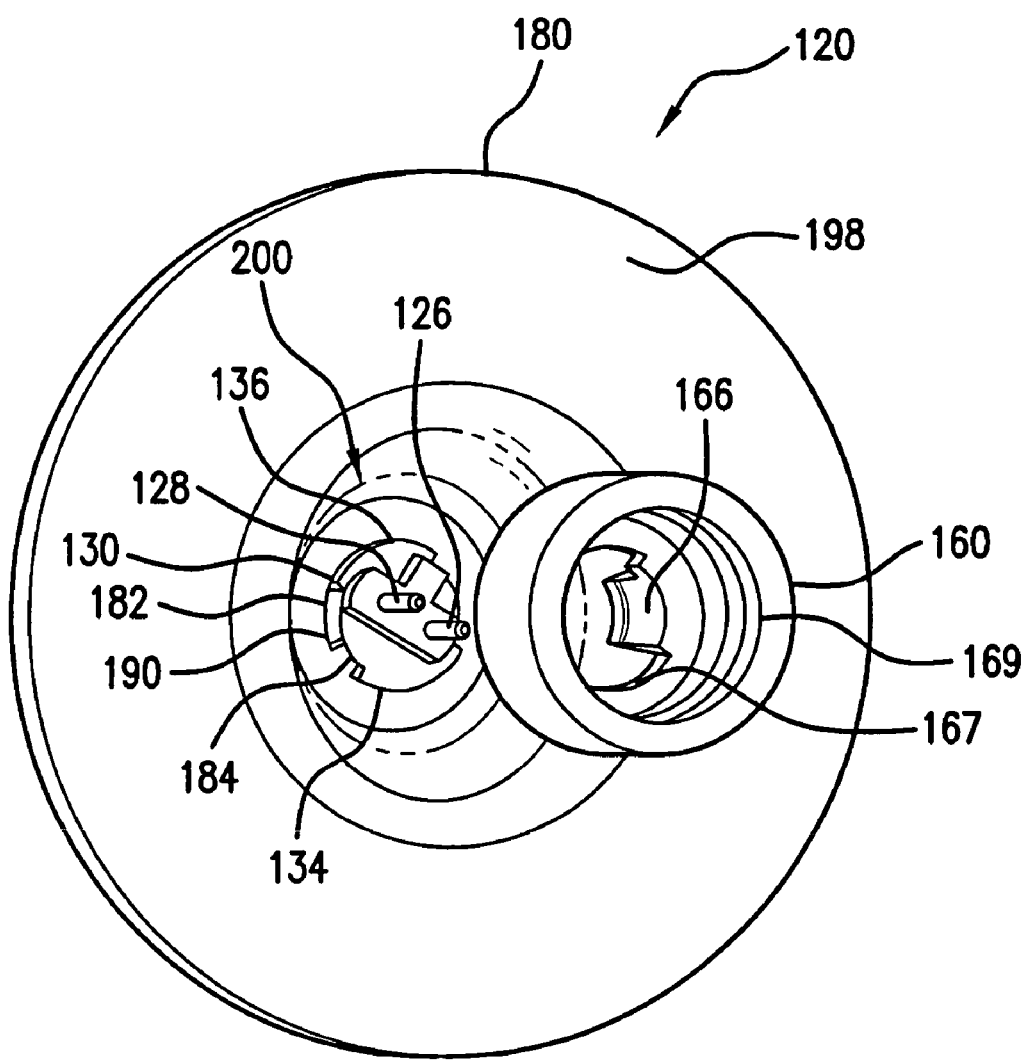
FIG. 4 shows an isometric view of the initiator assembly shown in FIG. 3.
Figure 5:
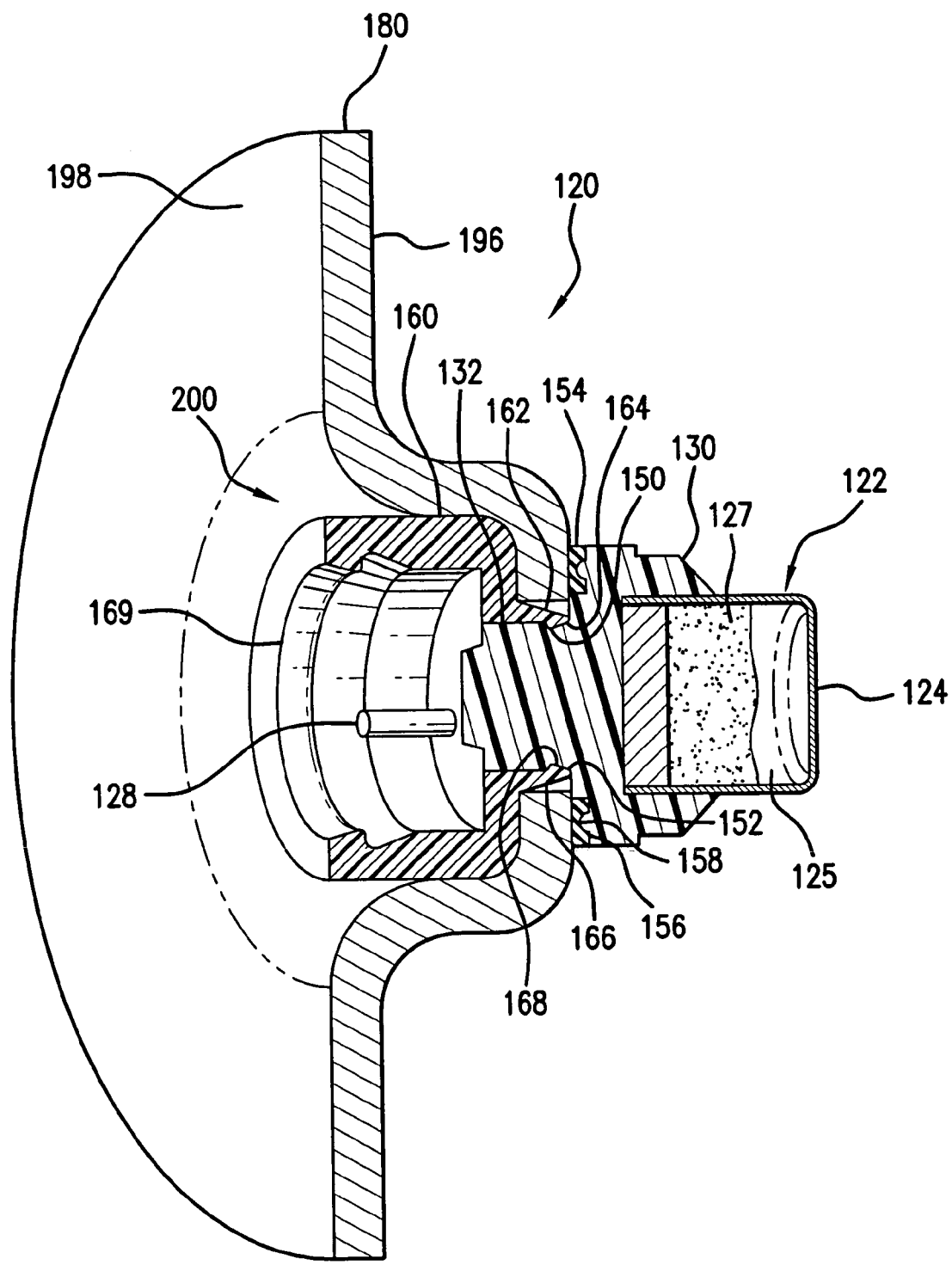
FIG. 5 shows a sectional view of the initiator assembly shown in FIGS. 3 and 4.

FIGS. 3–5 show an initiator assembly 120 according to another embodiment of this invention. FIG. 3 snows an exploded view of the initiator assembly 120. The initiator assembly 120 includes an initiator 122 having an initiator cup 124 defining a storage chamber 125 containing a reactive charge 127. The initiator 122 also includes two electrical connector pins 126 and 128 in reaction initiating communication with the reactive charge 127. A molded body 130 fits over at least a portion of the initiator 122. The molded body 130 includes an extension portion 132 fitting over at least a portion of the electrical connector pins 126 and 128. The molded body extension portion 132 includes a first locking flange 134 on a first side of the extension portion 132 and a second locking flange 136 on a second side of the extension portion 132 opposite the first side of the extension portion 132. The initiator 122 and molded body 130 combination shown in FIGS. 3–5 is similar, and desirably can be identical, to the initiator 22 and molded body 30 combination shown in FIG. 1.

The molded body 130 is joined to a plate 180. In one embodiment of the invention, the plate 180 is a base of an inflator device. In another embodiment of the invention, the plate 180 is another, e.g., a non-base, wall of an inflator device. In one preferred embodiment of the invention, the plate is a wall or base of an integral, one-piece inflator device housing. In another preferred embodiment of the invention, the plate is an adapter plate for an inflator device that forms at least part of a base or other wall of the inflator device.

The plate 180 includes a plate opening 182 and two mating lugs adjacent the plate opening 182. A first mating lug 184 protrudes into the plate opening 182 and a second mating lug 186 protrudes into the plate opening 182 on an opposite side from the first mating lug 184. To join the molded body 130 to the plate 180, a portion of the molded body extension portion 132 is inserted into the plate opening 182 such that the first locking flange 134 aligns with the first mating lug 184 and the second locking flange 136 aligns with the second mating lug 186. Each locking flange of the extension portion 132 fits through one of two notches 190 and 192 of the plate opening 182. The notches 190 and 192 of the plate opening 182 are formed by the protruding mating lugs 184 and 186, and each of the notches 190 and 192 are disposed adjacent to and between the mating lugs 184 and 186. Once inserted into the plate opening 182, the molded body 130 is rotated about an axis that is perpendicular to a surface 188 of the plate 180, thereby lockingly engaging the first locking flange 134 with the first mating lug 184 and the second locking flange 136 with the second mating lug 186. As discussed above the angle of rotation generally depends on various factors such as the number, size and configuration of the locking flanges and mating lugs. The angle of rotation of the molded body 130 shown in FIGS. 3–5 is about 90 degrees or less.

The plate 180 includes a centrally disposed plate cup portion 194 extending from a plate first side 196. On a plate second side 198, the plate cup portion 194 forms a cavity 200. A connector socket 160 is at least partially disposed on a second side 198 of the plate 180 and in the cavity 200. The connector socket 160 includes a first socket arm 162 having a first latch tab 164 and a second socket arm 166 having a second latch tab 168.

FIG. 4 shows a partially exploded view of the initiator assembly 120. As shown, a portion of the molded body extension portion 132 extends through the plate opening 182. The first locking flange 134 is lockingly engaged with the first mating lug 184 and the second locking flange 136 is lockingly engaged with the second mating lug 186. To join the molded body 130 to the plate 180, the molded body extension portion 132 is first inserted into the plate opening 182 such that the first and second locking flanges 134 and 136 are disposed in plate opening notches 190 and 192, respectively, and aligned with the first and second mating lugs 184 and 186, respectively. The molded body 130 is then rotated to join the molded body 130 to the plate 180. Rotating the molded body 130 lockingly engages the first and second locking flanges 134 and 136 to the corresponding first and second mating lug 184 and 186.

The connector socket 160 is disposed on the second side 198 of the plate 180 and, as shown in FIG. 5, the first and second socket arms 162 and 166 extend through the notches 190 and 192, respectively. The first latch tab 164 engages the first molded body extension portion groove 150 and the second latch tab 168 engages the second molded body extension portion groove 152, thereby securing the connector socket to the molded body 130 and the plate 180. The connector socket 160 also acts to maintain the first and second locking flanges 134 and 136 in locking engagement with the mating lugs 184 and 186. As the first and second socket arms 162 and 166 extend into the notches 190 and 192, respectively, the molded body 130 is blocked from rotating back to unlock the first and second locking flanges 134 and 136. The connector socket 160 includes a mating interface 169 that contains at least a portion of the electrical connector pins 126 and 128, which extend through a connector socket opening 167.

A sealing gasket 154 is disposed about the molded body extension portion 132 and between the molded body 130 and the plate 180. The sealing gasket 154 includes a groove 158 that is adapted to receive a rim 156 on the molded body 130. The rim 156 in combination with the groove 158 maintain the position of the sealing gasket 154 during the compression of the sealing gasket 154 that occurs when the molded body 130 is joined to plate 180.

In one embodiment of the invention, the molded body 130 and the connector socket 160 are formed of plastic. After being joined together, and to the plate 180, the plastic molded body 130 and plastic connector socket 160 can be welded together and/or to the plate 180, such as by ultrasonic welding.

Figure 6:
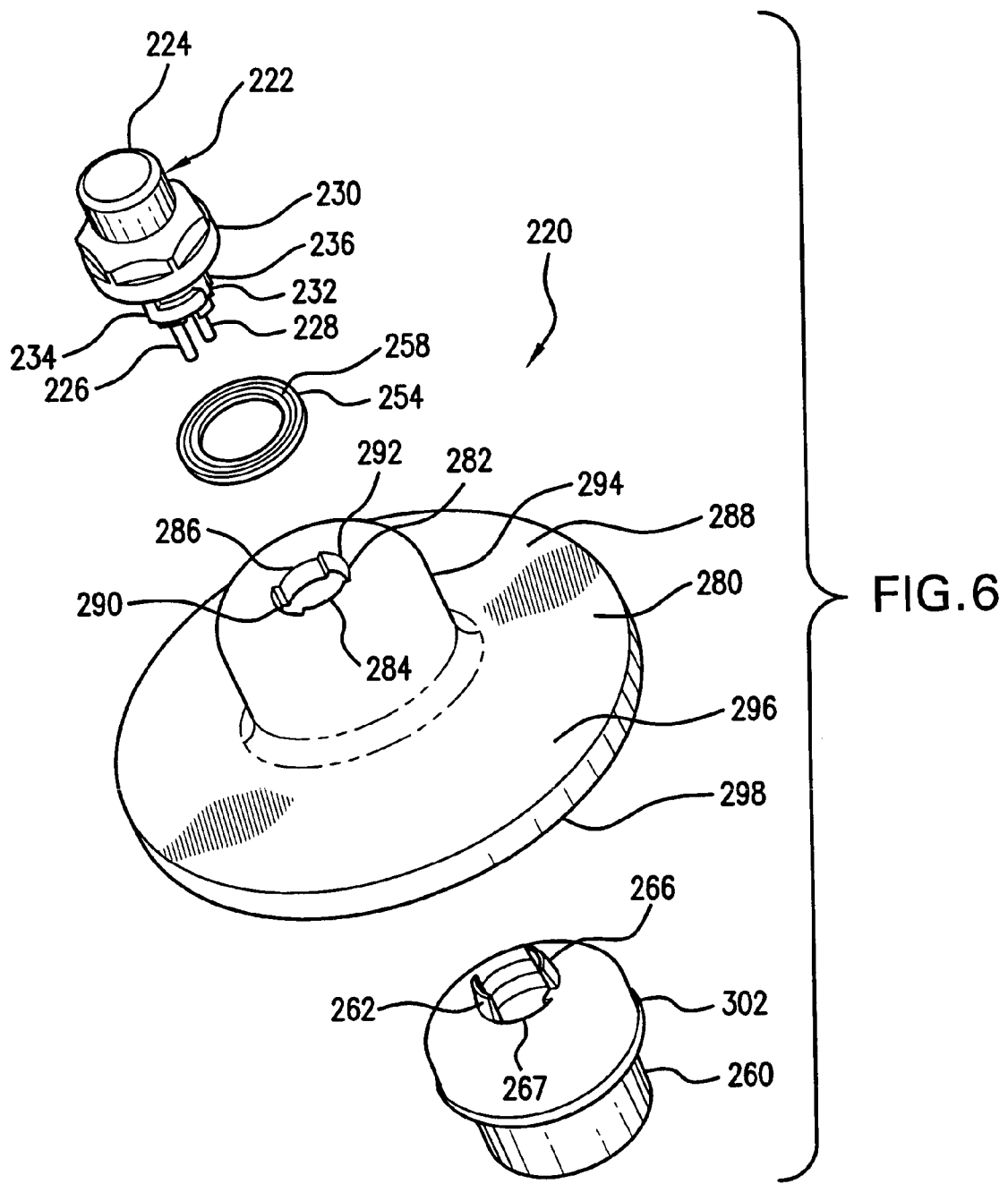
FIG. 6 shows an exploded view of an initiator assembly according to another embodiment of the invention.
Figure 7:
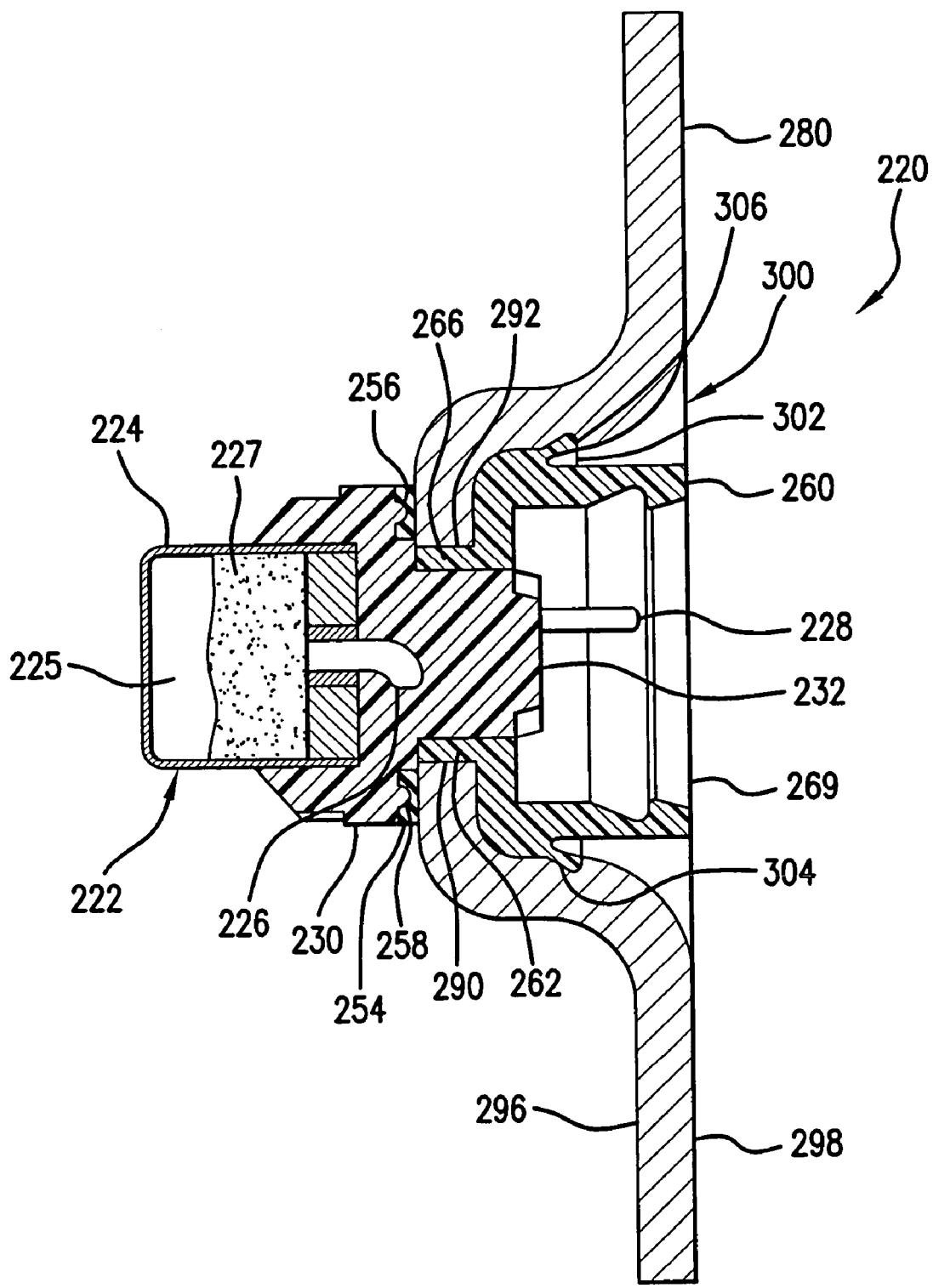
FIG. 7 shows a sectional view of the initiator assembly shown in FIG. 6

FIGS. 6 and 7 show an initiator assembly 220 according to another embodiment of the invention. FIG. 6 shows an exploded view of the initiator assembly 220. The initiator assembly 220 includes an initiator 222 having an initiator cup 224 defining a storage chamber containing a reactive charge, shown in FIG. 7 as storage chamber 225 containing a reactive charge 227. The initiator 222 also includes two electrical connector pins 226 and 228 in reaction initiating communication with the reactive charge 227. A molded body 230 fits over at least a portion of the initiator 222. The molded body 230 includes an extension portion 232 fitting over at least a portion of the electrical connector pins 226 and 228. The molded body extension portion 232 includes a first locking flange 234 on a first side of the extension portion 232 and a second locking flange 236 on a second side of the extension portion 232 opposite the first side of the extension portion 232. The initiator 222 and molded body 230 combination shown in FIGS. 6 and 7 is similar to the initiator 22 and molded body 30 combination shown in FIG. 1. One difference between the molded body 230 and the molded body 30, is that the molded body 230 does not include a groove in an outer surface of the molded body extension portion.

The molded body 230 is joined to an inflator device plate 280. As will be appreciated by one skilled in the art following the teachings herein provided, the molded body 230 can be joined to any other wall of an inflator device other than the plate, or an adapter plate that forms a wall or base of an inflator device. The plate 280 includes a plate opening 282 and two mating lugs adjacent the plate opening 282. A first mating lug 284 protrudes into the plate opening 282 and a second mating lug 286 protrudes into the plate opening 282 on an opposite side from the first mating lug 284. To join the molded body 230 to the plate 280, a portion of the molded body extension portion 232 is inserted into the plate opening 282 such that the first locking flange 234 aligns with the first mating lug 284 and the second locking flange 236 aligns with the second mating lug 286. Each locking flange of the extension portion 232 fits through one of two notches 290 and 292 of the plate opening 262. The notches 290 and 292 of the plate opening 282 are formed by the protruding mating lugs 284 and 286, and each of the notches 290 and 292 are disposed adjacent to and between the mating lugs 284 and 286. Once inserted into the plate opening 282, the molded body 230 is rotated about an axis that is perpendicular to a surface 288 of the plate 280, thereby lockingly engaging the first locking flange 234 with the first mating lug 284 and the second locking flange 236 with the second mating lug 286. As discussed above the angle of rotation generally depends on various factors such as the number, size and configuration of the locking flanges and mating lugs. The angle of rotation of the molded body 230 shown in FIGS. 6 and 7 is about 90 degrees or less.

The plate 280 includes a centrally disposed cup portion 294 extending from a plate first side 296. On a plate second side 298, the cup portion 294 forms a cavity 300. A connector socket 260 is at least partially disposed on a second side 298 of the plate 280 and in the cavity 300. The connector socket 260 includes a first socket arm 262 and a second socket arm 266. In the embodiment of the invention shown in FIGS. 6 and 7, the socket arms 262 and 266 do not include latch tabs, as do the socket arms 62 and 66 shown in FIG. 1 and the socket arms 162 and 166 shown in FIGS. 3 and 5.

The connector socket 260 is disposed on the second side 298 of the plate 280 and, as shown in FIG. 7, the first and second socket arms 262 and 266 extend through the notches 290 and 292, respectively. The connector socket 260 acts to maintain the first and second locking flanges 234 and 236 in locking engagement with the mating lugs 284 and 286. As the first and second socket arms 262 and 266 extend into the notches 290 and 292, respectively, the molded body 230 is blocked from rotating back to unlock the first and second locking flanges 234 and 236. The connector socket 260 includes a mating interface 269 that contains at least a portion of the electrical connector pins 226 and 228, which extend through a connector socket opening 267.

The connector socket 260 includes a protrusion 302 that, when the connector socket 260 is inserted into the cavity 300, fits into a corresponding slit 304 in a surface of the plate 280 within the cavity 300. The slit 304 includes a shoulder 306. The protrusion 304 fits into the slit 304 to join the connector socket 260 to the plate 280. Once the protrusion 304 is within the slit 304, the shoulder 306 keeps the protrusion 302 in place, and blocks the connector socket from sliding out of, or otherwise be removed from, the cavity 300. As shown in FIGS. 6 and 7, the protrusion 302 extends around an entire outer circumference of the connector socket 260, and the slit 304 correspondingly extends around the inner circumference of the cavity 300. As will be appreciated by one skilled in the art following the teachings herein provided, in the broader practice of the invention various sizes, shapes and configurations are available for the protrusions and slits according to particular embodiments of the initiator assembly of the invention. For example, in one embodiment of the invention, a connector socket can be joined to an inflator device base with two or more protrusions and corresponding slits on opposing sides of the connector socket and inner surface of the cavity, respectively. As will be appreciated, in such an embodiment the protrusions and slits may extend only partially around the outer circumference of the connector socket and the inner surface of the cavity, respectively.

In another embodiment of the invention, the initiator assembly incorporates both at least one connector socket arm having a latch tab that fits into a groove in the molded body extension portion and a protrusion that extends around an entire outer circumference of the connector socket and fits within a slit in an inflator device base. As will be appreciated, using both described structures to connect the connector socket, molded body, and the plate can increase the strength of the connection between these elements and thus the strength of the initiator assembly.

Referring back to FIGS. 6 and 7, a sealing gasket 254 is disposed about the molded body extension portion 232 and between the molded body 230 and the plate 280. The sealing gasket 254 includes a groove 258 that is adapted to receive a rim 256 on the molded body 230. The rim 256 in combination with the groove 258 maintain the position of the sealing gasket 254 during the compression of the sealing gasket 254 that occurs when the molded body 230 is joined to the plate 280.

In one embodiment of the invention, the molded body 230 and the connector socket 260 are formed of plastic. After being joined together, and to the plate 280, the plastic molded body 230 and plastic connector socket 260 can be welded together and/or to the plate 280, such as by ultrasonic welding.

Thus, the invention provides an initiator assembly that can be lockingly joined to an inflator device. The interlocking components of the initiator assembly provide an initiator assembly that is relatively inexpensive and easy to produce and assemble to an inflator device. In addition, the initiator assembly can provide a desirable hermetic seal between the initiator assembly and the inflator device.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An initiator assembly for an inflator device having at least one inflator device mating lug, the initiator assembly comprising:
   an initiator including an initiator cup at least in part defining a storage chamber containing a reactive charge, the initiator also including at least one electrical connector in reaction initiating communication with the reactive charge; and
   a molded body fitting over at least a portion of the initiator, the molded body including at least one locking flange;
   wherein the at least one locking flange is adapted to lockingly engage the at least one inflator device mating lug and the molded body is adapted to rotate about an axis perpendicular to a surface of a wall of the inflator device with an angle of rotation of about 180 degrees or less to effect the locking engagement of the locking flange with the inflator device mating lug.

2. The initiator assembly of claim 1 wherein the molded body comprises an extension portion including a first locking flange and a second locking flange on an opposite side of the extension portion from the first locking flange, and the first locking flange is adapted to lockingly engage a corresponding first inflator device mating lug and the second locking flange is adapted to lockingly engage a corresponding second inflator device mating lug.

3. The initiator assembly of claim 2 wherein the molded body is adapted to rotate about an axis perpendicular to a surface of a wall of the inflator device with an angle of rotation of about 90 degrees or less to effect the locking engagement of the first and second locking flanges with the corresponding first and second inflator device mating lugs.

4. The initiator assembly of claim 2 wherein a sealing gasket is disposed about the extension portion of the molded body and between at least a portion of the molded body and the inflator device.

5. The initiator assembly of claim 1 additionally comprising a sealing gasket disposed between at least a portion of the molded body and the inflator device.

6. The initiator assembly of claim 1 additionally comprising:
   a groove in an outer surface of an extension portion of the molded body; and
   a connector socket including a socket arm having a latch tab;
   wherein at least a portion of the molded body is disposed on a first side of a wall of the inflator device, at least a portion of the connector socket is disposed on a second side of the wall of the inflator device opposite the inflator device wall first side, and the socket arm latch tab is adapted to extend into an opening in the inflator deVice wall and engage the extension portion groove.

7. The initiator assembly of claim 6 wherein the connector socket includes a connector socket opening and the at least one electrical connector extends through the opening in the inflator device wall and the connector socket opening.

8. The initiator assembly of claim 7 wherein the molded body and the connector socket are formed of plastic.

9. The initiator assembly of claim 8 wherein the plastic molded body and the plastic connector socket are ultrasonically welded to at least one of each other and the inflator device wall.

10. The initiator assembly of claim 1 additionally comprising:
    a connector socket including a socket arm and a protrusion extending at least partially around an outer circumference of the connector socket;
    wherein at least a portion of the molded body is disposed on a first side of a wall of the inflator device, at least a portion of the connector socket is disposed on a second side of the wall of the inflator device opposite the inflator device wall first side, the socket arm is adapted to extend into an opening in the inflator device wall, and the connector socket protrusion fits into a slit in the inflator device wall to join the connector socket to the inflator device wall.

11. The initiator assembly of claim 10, wherein the socket arm, when extended into the opening in the inflator device, maintains the at least one locking flange in locking engagement with the at least one inflator device mating lug.

12. An initiator assembly, comprising:
    an initiator including an initiator cup at least in part defining a storage chamber containing a reactive charge and the initiator also including at least one electrical connector in reaction initiating communication with the reactive charge;
    a molded body fitting over at least a portion of the initiator, the molded body including an extension portion including a locking flange; and
    a plate including a plate opening and a mating lug adjacent the plate opening;
    wherein at least a portion of the molded body extension portion extends into the plate opening and the locking flange is lockingly engaged with the mating lug.

13. The initiator assembly of claim 12 wherein the locking flange is lockingly engaged with the mating lug by rotating the molded body about an axis perpendicular to a surface of the plate with an angle of rotation of about 180 degrees or less.

14. The initiator assembly of claim 12 wherein the locking flange is a first locking flange and the molded body extension portion additionally comprises a second locking flange on a side of the extension portion opposite the first locking flange;
    the mating lug is a first mating lug and the plate additionally comprises a second mating lug adjacent the plate opening on a side of the plate opening opposite the first mating lug;
    wherein the first locking flange is lockingly engaged with the first mating lug and the second locking flange is lockingly engaged the second mating lug.

15. The initiator assembly of claim 14, wherein the first and second locking flanges are lockingly engaged with the first and second mating lugs by rotating the molded body about an axis perpendicular to a surface of the plate with an angle of rotation of about 90 degrees or less.

16. The initiator assembly of claim 12 additionally comprising:
    a groove in an outer surface of the molded body extension portion; and
    a connector socket including a socket arm having a latch tab;
    wherein at least a portion of the molded body is disposed on a first side of the plate, at least a portion of the connector socket is disposed on a second side of the plate opposite the plate first side, the socket arm extends through the plate opening and the second arm latch tab engages the extension portion groove.

17. The initiator assembly of claim 16 wherein the connector socket includes a connector socket opening and at least a portion of the at least one electrical connector extends through the plate opening and the connector socket opening.

18. The initiator assembly of claim 16 wherein the plate first side includes a centrally disposed plate cup portion forming a cavity on the plate second side and at least a portion of the connector socket is disposed in the cavity.

19. The initiator assembly of claim 12 additionally comprising a sealing gasket disposed about the molded body extension portion and between the molded body and the plate.

20. The initiator assembly of claim 12 wherein the molded body and the connector socket are formed of plastic.

21. The initiator assembly of claim 20 wherein the plastic molded body and the plastic connector socket are ultrasonically welded to at least one of each other and the plate.

22. The initiator assembly of claim 12 wherein the plate is one of an inflator device wall, an inflator device base, and an adapter plate.

23. An initiator assembly, comprising:
    an initiator including an initiator cup at least in part defining a storage chamber containing a reactive charge and the initiator also including at least one electrical connector in reaction initiating communication with the reactive charge;
    a molded body fitting over at least a portion of the initiator, the molded body including an extension portion over at least a portion of the at least one electrical connector, the molded body extension portion including a first locking flange on a first extension portion side and a second locking flange on a second extension portion side opposite the first extension portion side, the molded body extension portion additionally including a first groove disposed in an outer surface and between the first and second locking elements and a second groove disposed in an outer surface and between the first and second locking flange on a side of the molded body extension portion opposite the first groove;

a connector socket including a first socket arm having a first latch tab and a second socket arm having a second latch tab; and a plate including a plate opening and a first mating lug adjacent the plate opening and a second mating lug adjacent the plate opening on an opposite side from the first mating lug;

at least a portion of the molded body disposed on a first side of the plate and at least a portion of the connector socket disposed on a second side of the plate opposite the plate first side;

wherein at least a portion of the molded body extension portion extends through the plate opening, the first locking flange is lockingly engaged with the first mating lug and the second locking flange is lockingly engaged with the second mating lug, and the first latch tab of the connector socket first arm is engaged with the first groove and the second latch tab of the connector socket second arm is engaged with the second groove.

24. The initiator assembly of claim 23 wherein a sealing gasket is disposed about the extension portion of the molded body and between at least a portion of the molded body and the inflator device.

25. The initiator assembly of claim 23 wherein the molded body and the connector socket are formed of plastic.

26. The initiator assembly of claim 23 wherein the plastic molded body and the plastic connector socket are ultrasonically welded to at least one of each other and the plate.

27. A method of assembling an initiator assembly that includes an initiator including an initiator cup at least in part defining a storage chamber containing a reactive charge and including at least one electrical connector in reaction initiating communication with the reactive charge, a molded body fitting over at least a portion of the initiator, the molded body including an extension portion including a locking flange, and a plate including a plate opening and a mating lug adjacent the plate opening, wherein at least a portion of the molded body extension portion extends into the plate opening and the locking flange is lockingly engaged with the mating lug, the method comprising:

inserting the molded body extension portion into the plate opening;

aligning the locking flange with the mating lug;

rotating the molded body about an axis perpendicular to a surface of the plate; and engaging the locking flange with the mating lug to lock the molded body to the plate.

28. A method of assembling an initiator assembly that includes an initiator including an initiator cup at least in part defining a storage chamber containing a reactive charge and including at least one electrical connector in reaction initiating communication with the reactive charge, a molded body fitting over at least a portion of the initiator, the molded body including an extension portion including a locking flange and a groove in an outer surface, a connector socket including a socket arm having a latch tab, and a plate including a plate opening and a mating lug adjacent the plate opening, wherein at least a portion of the molded body is disposed on a first side of the plate, at least a portion of the connector socket is disposed on a second side of the plate opposite the plate first side, the socket arm extends through the plate opening and the second arm latch tab engages the extension portion groove, the method comprising:

inserting the molded body extension portion into the plate opening;

aligning the locking flange with the mating lug;

rotating the molded body about an axis perpendicular to a surface of the plate;

engaging the locking flange with the mating lug to lock the molded body to the plate; and latching the socket arm latch tab to the extension portion groove.

* * * * *